Patented Oct. 20, 1953

2,656,360

UNITED STATES PATENT OFFICE 2,656,360

PROCESS FOR PREPARING N-ACYL DERIVATIVES OF AMIDE COMPOUNDS

Hugh J. Hagemeyer, Jr., Kingsport, Tenn., assignor to Eastman Kodak Company, Rochester, N. Y., a corporation of New Jersey No Drawing. Application May 23, 1951, Serial No. 227,927

9 Claims. (Cl. 260—326.3)

This invention relates to a process for preparing N-acyl derivatives of amides, lactams and imides.

The acylation of amides and amide group containing compounds having at least one available hydrogen atom on the amide nitrogen atom by reaction with an organic acid anhydride or an acid halide is well known. For example, diacetamide has been prepared by reacting acetamide with acetic anhydride or with acetyl chloride (Beilstein's Handbuch Org. Chem. 4th ed. 2, page 181). In similar manner, other amide group containing compounds have been prepared such as N-acetyl pyrrolidone from pyrrolidone (ibid., 21, page 237), N-acetyl-alpha-piperidone from piperidone (ibid., 21, page 238) and N-acetyl succinimide from succinimide (ibid., 21, page 378). More recently, D'Alelio et al. have described the preparation of N-methyl diacylamides from the corresponding N-methyl acylamides [J. Am. Chem. Soc. 59, pages 109–11 (1937)]. However, such prior art methods are generally unsatisfactory and usually result in low yields of difficultly purified products. The reaction of acyl halides with amide compounds, that is, with amides or with amide group containing compounds, requires three mol equivalents of the amide compound to prepare a single mol equivalent of N-acyl amide compound. Acylation with anhydrides is slow, incomplete and usually results in the formation of substantial quantities of nitrile due to the dehydrating effect of the anhydride on the amide group. In addition, the purification and separation of the N-acyl amide compounds is quite involved and a poor quality product often results.

I have now found that N-acyl amide compounds can be readily prepared in high yields and in relatively pure state by acylation of the amide nitrogen with certain unsaturated esters of which isopropenyl acetate is exemplary.

It is, accordingly, an object of the invention to provide an improved and convenient method for acylating amide compounds. Other objects will become apparent hereinafter.

In accordance with my invention, I acylate amide compounds containing not more than one amide group and having at least one available hydrogen atom on the amide nitrogen with an unsaturated monocarboxylic ester of the following general formula:

$$CH_2=\overset{R}{\underset{|}{C}}-O-\overset{O}{\underset{\|}{C}}-R$$

wherein each R represents an alkyl group, an aralkyl group or an aryl group (e. g. methyl, ethyl, propyl, butyl, hexyl, benzyl, phenyl groups, etc.). The reaction will not take place at all in the absence of an acid type catalyst and only to a very slight extent except at elevated temperatures such as reflux temperatures or higher. The temperature range useful for practical operation can vary from about 50 to 300° C., but preferably from 70 to 150° C. The reactants must also be present in such proportions that at least one mole of the unsaturated ester is present for each mole of the amide to be acylated. Inert diluents can be employed in the reaction mixture such as diisopropyl ether, benzene, toluene, carbon tetrachloride, ethylene dichloride, etc. Pressures greater than atmospheric can be used. The reaction is carried out advantageously by mixing the unsaturated ester with the amide, adding from 0.01–2 per cent by weight of the reactants of the acid esterification catalyst, and heating to reflux to cause the reaction to take place and to separate the ketone by-product. The ketone can be removed continuously as by distillation and is an exact measure of the degree of acylation. Suitable acid esterification catalysts include sulfuric acid, p-toluene sulfonic acid, ortho phosphoric acid, acetyl sulfoacetic acid, chlorosulfonic acid, and the like.

The reaction can be illustrated by the following equations wherein isopropenyl acetate, for example, reacts with amide nitrogens containing one or two available hydrogen atoms to form N-acetyl amides:

(1) 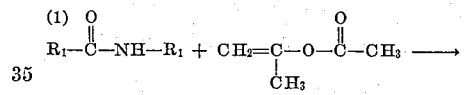

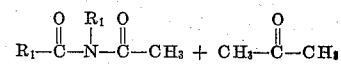

wherein each $R_1$ represents an atom of hydrogen, an alkyl group or an aryl group; and to form N-acetyl cyclic imides:

(2) 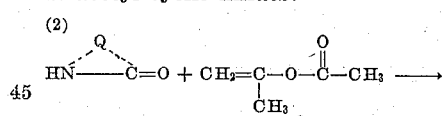

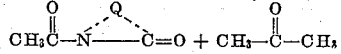

wherein Q represents the non-metallic elements necessary to complete a pyrrolidone nucleus, a piperidone nucleus, a maleimide nucleus, a succinimide nucleus, a glutarimide nucleus, a phthalimide nucleus, etc. The tendency of the unsaturated members to polymerize during the reaction can be retarded by use of polymerization catalysts such as, for example, a small quantity of added hydroquinone.

Typical amide compounds which can be acylated in accordance with my improved method include formamide, acetamide, propionamide, butyramide, isobutyramide, sec. butyramide, valeramide, lauramide, etc. and their N-alkyl substituted derivatives such as N-methyl formamide, N-methyl acetamide, N-ethyl acetamide, N-methyl butyramide, etc., alpha-pyrrolidone, gamma-valerolactam, delta-valerolactam, succinimide, glutarimide, phthalimide, etc. Typical unsaturated esters which I employ in practicing my invention include isopropenyl acetate (2-acetoxypropene-1), 2-acetoxyhexene-1, 2-acetoxyheptene-1, 2-(chloroacetoxy)-hexene-1, 2-benzoyloxyhexene-1, 2-(phenylacetoxy)-propene-1, 2-acetoxy-3-phenylpropene, isopropenyl propionate, isopropenyl butyrate, and the like. Such unsaturated esters in which the acid radical is an acetate radical (i. e. acetoxy derivatives) can be prepared by condensing the appropriate ketone with ketene, in the presence of sulfuric acid. See Gwynn and Degering, J. Am. Chem. Soc. 64, page 2216 (1942). All the unsaturated esters can be prepared by adding a monocarboxylic acid (e. g. acetic acid, propionic acid, butyric acid, benzoic acid, etc.) to the appropriate monosubstituted acetylene, in the presence of boron trifluoride. See Hennion et al., J. Amer. Chem. Soc. 56, page 1802 (1934).

The following examples will serve to illustrate further the manner of practicing my invention.

Example 1.—Diacetamide

A mixture of 59 g. (1.0 mol) of acetamide, 110 g. (1.1 mol) of isopropenyl acetate and 10 drops (equivalent to about 1 g.) of concentrated sulfuric acid were refluxed until 56 g. of acetone was distilled off. There were obtained from the residue 74 g. (0.73 mol) of diacetamide distilling at from 220° to 222° C.

Example 2.—N-methyl diacetamide

A mixture of 73 g. (1 mol) of N-methyl acetamide, 110 g. (1.1 mol) of isopropenyl acetate and 10 drops of concentrated sulfuric acid was placed in a flask on a short packed column. The mixture was refluxed and the quantitative amount of acetone was distilled off. A yield of 96 g. (0.84 mol) of N-methyl diacetamide was obtained. It distilled at 191°–192° C. (740 mm.) and had a refractive index of 1.4508 at 20° C.

Example 3.—N-methyl N-acetyl formamide

A mixture of 59 g. (1 mol) of N-methyl formamide, 110 g. (1.1 mol) of isopropenyl acetate and 10 drops of concentrated sulfuric acid was refluxed and the quantitative amount of acetone distilled off. An 83 per cent yield of N-methyl N-acetyl formamide was obtained distilling at 183°–186° C. at 740 mm. and having a refractive index of 1.4500 at 20° C.

Example 4.—N-acetyl pyrrolidone 42 g. (0.5 mol) of pyrrolidone, 100 g. (1.0 mol) of isopropenyl acetate and 10 drops of concentrated sulfuric acid were placed in a flask provided with a short packed column. The mixture was refluxed and acetone removed by distillation. After removal by distillation of the excess isopropenyl acetate, there were obtained 47 g (0.37 mol) of N-acetyl alpha-pyrrolidone, B. P. 125° C. at 73 mm., refractive index 1.4845 at 20° C. Analysis for nitrogen gave 10.7 per cent by weight compared with calculated theory of approximately 11.0 per cent.

Example 5.—N-acetyl piperidone 99 g. (1 mol) of delta-valerolactam, 200 g. (2 mol) and 10 drops of concentrated sulfuric acid were refluxed and the theoretical quantity of acetone distilled off through a short Vigreux column. After distilling off the excess isopropenyl acetate at atmospheric pressure, the N-acetyl-alpha-piperidone was distilled off at 128° C. at 75 mm. pressure, B. P. 236°–237° C. at 740 mm. A yield of 87 per cent of theory based on the delta-valerolactam was obtained.

Example 6.—N-acetyl succinimide 45 g. (0.45 mol) of succinimide, 100 g. (1 mol) of isopropenyl acetate and 0.5 g. of p-toluene sulfonic acid were mixed together and heated to reflux, the acetone being distilled off as it formed. The excess isopropenyl acetate was removed by atmospheric distillation. A yield of 92 per cent of N-acetyl succinimide was obtained distilling at 165°–168° C. at 10 mm. pressure.

Example 7.—N-acetyl maleimide

A mixture of 97 g. (1 mol) of maleimide, 150 g. (1.5 mol) of isopropenyl acetate, 0.5 g. of phosphoric acid and 0.5 g. of copper oxide was heated to reflux using a still with a small distillation column, and 48 g. of acetone was distilled off. After removing the excess isopropenyl acetate, the N-acetyl maleimide was recovered in approximately 43 per cent yield. Analysis of this product gave 9.89 per cent by weight of nitrogen compared with calculated theory of 10.0 per cent nitrogen. The relatively low yield of N-acetyl maleimide was due to the formation of some polymer during the reaction.

Proceeding in the manner described in the examples, other N-acyl derivatives of the mentioned amide compounds can readily be prepared in good yields and high quality using as the acylating agent any of the mentioned unsaturated esters, but more particularly isopropenyl acetate, in the presence of an acid esterification catalyst.

What I claim is:

1. A process for preparing an N-acyl derivative of an amide selected from the group consisting of a saturated aliphatic carboxylic monoamide having at least one available hydrogen atom on the amide nitrogen atom, a lactam having an available hydrogen atom on the amide nitrogen and a cyclic imide having an available hydrogen atom and a cyclic imide having an available hydrogen atom on the amide nitrogen atom, which comprises condensing the said amide with an unsaturated ester of the following general formula:

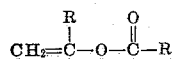

wherein each R represents a member selected from the group consisting of an alkyl group, an aralkyl group and an aryl group, at a temperature of from 50 to 300° C., in the proportions of at least one mole of the unsaturated ester to each mole of the said amide, in the presence of an acid esterification catalyst.

2. A process for preparing an N-acetyl derivative of a saturated aliphatic carboxylic monoamide having at least one available hydrogen atom on the amide nitrogen atom which comprises condensing the said amide with isopropenyl acetate, at a temperature of from 50 to 300° C., in the proportions of at least one mole of the isopropenyl acetate to each mole of the said amide, in the presence of an acid esterification catalyst.

3. A process for preparing an N-acetyl derivative of a lactam having at least an available hydrogen atom on the amide nitrogen atom which comprises condensing the said lactam with isopropenyl acetate, at a temperature of from 50 to 300° C., in the proportions of at least one mole of the isopropenyl acetate to each mole of the said lactam, in the presence of an acid esterification catalyst.

4. A process for preparing an N-acetyl derivative of a cyclic imide having an available hydrogen atom on the amide nitrogen which comprises condensing the said cyclic imide with isopropenyl acetate, at a temperature of from 50 to 300° C., in the proportions of at least one mole of the isopropenyl acetate to each mole of the said cyclic imide, in the presence of an acid esterification catalyst.

5. A process for preparing diacetamide which comprises condensing acetamide with isopropenyl acetate at a temperature of from 50 to 300° C., in the proportions of at least one mole of isopropenyl acetate to each mole of acetamide, in the presence of sulfuric acid, and separating the diacetamide which forms.

6. A process for preparing N-methyl diacetamide which comprises condensing N-methyl acetamide with isopropenyl acetate, at a temperature of from 50 to 300° C., in the proportions of at least one mole of isopropenyl acetate to each mole of N-methyl acetamide, in the presence of sulfuric acid, and separating the N-acetyl diacetamide which forms.

7. A process for preparing N-acetyl-alpha-pyrrolidone which comprises condensing pyrrolidone with isopropenyl acetate, at a temperature of from 50 to 300° C., in the proportions of at least one mole of isopropenyl acetate to each mole of pyrrolidone, in the presence of sulfuric acid, and separating the N-acetyl-alpha-pyrrolidone which forms.

8. A process for preparing N-acetyl succinimide which comprises condensing succinimide with isopropenyl acetate, at a temperature of from 50 to 300° C., in the proportions of at least one mole of isopropenyl acetate to each mole of succinimide, in the presence of sulfuric acid, and separating the N-acetyl succinimide which forms.

9. A process for preparing N-acetyl maleimide which comprises condensing maleimide with isopropenyl acetate, at a temperature of from 50 to 300° C., in the proportions of at least one mole of isopropenyl acetate to each mole of maleimide, in the presence of sulfuric acid, and separating the N-acetyl maleimide which forms.

HUGH J. HAGEMEYER, JR.

References Cited in the file of this patent

UNITED STATES PATENTS

| Number | Name | Date |
|---|---|---|
| 2,472,633 | Utermohlen | June 7, 1949 |

FOREIGN PATENTS

| Number | Country | Date |
|---|---|---|
| 489,311 | Great Britain | July 25, 1938 |